US006215784B1

United States Patent
Petras et al.

(10) Patent No.: US 6,215,784 B1
(45) Date of Patent: Apr. 10, 2001

(54) METHOD AND SYSTEM FOR VOICE CALL COMPLETION USING INFORMATION RETRIEVED FROM AN OPEN APPLICATION ON A COMPUTING MACHINE

(75) Inventors: Michael William Petras; Douglas Petty; Alan Stuart Frank, all of Nepean (CA)

(73) Assignee: Nortel Networks Limited, Montreal (CA)

( * ) Notice: Subject to any disclaimer, the term of this patent is extended or adjusted under 35 U.S.C. 154(b) by 0 days.

(21) Appl. No.: 08/997,989

(22) Filed: Dec. 24, 1997

(51) Int. Cl.$^7$ .................................................. H04L 12/66
(52) U.S. Cl. ............................................ 370/356; 379/216
(58) Field of Search .................................. 370/352, 353, 370/354, 355, 356, 357, 360, 400, 401, 410; 379/201, 213, 216, 265, 266, 93.24, 93.17, 93.25, 88.17; 709/217, 218, 219

(56) References Cited

U.S. PATENT DOCUMENTS

| | | | |
|---|---|---|---|
| 4,191,860 | 3/1980 | Weber | 179/18 |
| 5,724,412 | * 3/1998 | Srinivasan | 379/93.23 |
| 5,838,682 | * 11/1998 | Dekelbaum et al. | 370/401 |
| 5,850,433 | * 12/1998 | Rondeau | 379/201 |
| 5,884,032 | * 3/1999 | Bateman et al. | 709/204 |
| 5,991,394 | * 11/1999 | Dezonno et al. | 379/265 |
| 6,038,602 | * 3/2000 | Ishikawa | 709/227 |
| 6,078,583 | * 6/2000 | Takahara et al. | 370/356 |

FOREIGN PATENT DOCUMENTS

| | | | |
|---|---|---|---|
| 2677517 A1 | 10/1991 | (FR) | H04M/11/00 |

OTHER PUBLICATIONS

"Internet Call Center", Lucent Technologies web page, 1996.
"Internet Call Center", Lucent Technologies, 1996.
News Release "Lucent Technologies debuts WebCall in Japan", Lucent Technologies, May 8, 1997.
News Release "Lucent Technologies brings award–winning advanced call center capabilities to small businesses", Lucent Technologies, Jun. 10, 1997.
"Lucent Technologies' Internet Telephony Server", Lucent Technologies, 1997.

* cited by examiner

Primary Examiner—Wellington Chin
Assistant Examiner—Kwang B. Yao

(57) ABSTRACT

A method and apparatus for call completion using information extracted from an active application on a computing machine is described. Call initiation may be accomplished using a "warm-line" feature in which a default number is dialled after a predetermined time of an off-hook condition of a voice terminal, if no digits are dialled after the voice terminal is taken off-hook. The number dialled is a number used to connect the telephone set to computer-Controlled Telephony Integration hardware (CTI). On receipt of the call, the CTI hardware extracts Automatic Number Identification (ANI) information to determine the number of the calling party and verifies that the calling party is the subscriber to the service. If the calling party is the subscriber to the service, a query is sent to an IP address associated with the subscriber to retrieve information from an active application for completing a second leg of the call. The information may be a telephone number, or information which would permit the retrieval of a telephone number such as a name and address or an e-mail address. A directory service may be used to convert the information into a telephone number. Once a telephone number is obtained, the CTI hardware is used to complete the second leg of the call and the two calls are joined together. The advantage is a fast, convenient method of completing calls without dialling digits or manually converting one form of information into a diallable number.

31 Claims, 3 Drawing Sheets

METHOD AND SYSTEM FOR VOICE CALL COMPLETION USING INFORMATION RETRIEVED FROM AN OPEN APPLICATION ON A COMPUTING MACHINE

RELATED APPLICATIONS

This appliction is related to United States patent application entitled METHOD AND APPARATUS FOR ORIGINATING VOICE CALLS FROM A DATA NETWORK filed Oct. 10, 1997 and assigned Ser. No. 08/948,975, the specification of which is incorporated herein by reference in its entirety.

TECHNICAL FIELD

The present invention relates generally to voice call completion using computer-controlled telephony hardware which is outside the Public Switched Telephone Network (PSTN) and, in particular, to a method of completing a voice connection between first and second voice terminals using information retrieved from an open application on a computing machine operated by a call originating party.

BACKGROUND OF THE INVENTION

The telephone and the Personal Computer (PC) are among the most frequently used business machines. A great deal of effort has been invested in making the use of each more efficient. For example, the completion of telephone calls has been facilitated using features such as speed dial, redial and voice-activated dialling. Automated call handling applications have also been developed for use on multi-media PCs, but while a phone line is used for telephony it cannot be concurrently used for on-line functions such as data communications.

To date, efforts directed to improving the efficiency of using telephones have concentrated on making smarter telephones or smarter Private Branch Exchanges (PBXs) to enhance calling features, or combining telephones and personal computers for the same purpose. Both approaches have their drawbacks. Converting a telephone into a computing machine, or a computing machine into a part-time telephone are not the most practical uses of resources. A more economical and versatile approach is to leverage the inherent capabilities of each machine.

While modern telecommunications facilities such as the Internet provide a means for enabling a pooling of resources in order to leverage the capabilities of unrelated machines, the potential for such uses are only now beginning to be realized. For example, it would be advantageous to be able to automatically call the sender of an electronic mail message or a word processing document. However, in order to complete such calls at this time, it may be necessary to locate a record for the individual in a directory or the like using available information. After the telephone number is located, it must be dialled to place a call to the party. Typically, the number must be manually dialled. Although equipment to support enhanced computer telephony integration using a single telephone line exists in the form of Digital Simultaneous Voice and Data (DSVD) modems, this solution is presently costly and not broadly supported.

It would therefore be advantageous to provide a means for completing telephone calls using information retrieved automatically from a source independent of the telephone such as a computing machine.

SUMMARY OF THE INVENTION

It is an object of the invention to enable a user of a first voice terminal and a computing machine connected to a data network to complete a voice connection with a second voice terminal for which information for directly or indirectly identifying the second voice terminal is available in an open application on the computing machine.

It is a further object of the invention to provide a user having a telephone connected to a switched telephone network and a computing machine connected to a data network with facilities for completing a telephone call, without dialling, to a party referenced in a current page of an application open on the computing machine.

Yet a further object of the invention is to permit a user having a computing machine connected to the Internet to originate a voice connection between the user's voice terminal and another voice terminal that is directly or indirectly referenced in a current page of an application open on the computing machine.

The invention thereby provides a method of completing a voice connection between first and second voice terminals, comprising the steps of:

establishing a first voice connection between the first voice terminal and a predetermined termination;

locating a data address for a computing machine associated with the first voice terminal after the voice connection is established at the predetermined termination;

sending a data message to the data address requesting that information be retrieved from an open application on the computing machine;

retrieving the information from the open application and returning a data message including the information;

using the information at the predetermined termination to establish a second voice connection with the second voice terminal; and bridging together the first and second voice connections.

In accordance with a further aspect of the invention there is provided a system for completing a voice connection between first and second voice terminals, comprising in combination:

computer-controlled telephony hardware adapted to receive and to originate calls;

a server adapted to control the telephony hardware and determine an identification of the first voice terminal on receipt of a call from the first voice terminal, to determine a data address of a computing machine associated with the first voice terminal, and to send a message to request that information be retrieved from an application open on the computing machine;

means on the computing machine for receiving the message, retrieving the information from the open application and returning the information in a reply message to the server; and means for receiving the reply message, completing a voice connection with the second voice terminal from the telephony hardware using the information, and bridging together the first and second voice connections.

The invention thereby provides a fast and convenient method for placing a call to a person referenced in a current page of an open application on a computing machine, without manually locating the person in a directory, retrieving the telephone number of the person from the directory and dialling the number to effect the voice connection.

In accordance with a preferred embodiment of the invention, the user's telephone line is equipped to dial a default number if the telephone is placed in an off-hook condition and no digits are dialled within a predetermined period of time (typically 2–5 seconds). This feature is referred to as a "warm-line". The default number connects the user with a Computer Telephony Integration (CTI) card in a CTI server. The connection with the CTI server may also be accomplished using a "hot-line". With a hot-line, the default number is dialled as soon as the telephone is taken off-hook. On receipt of the call, the CTI server extracts the identity of the calling party from the call signaling information, and passes it to a "warm-line server". The identity (phone number) of the calling party is used to determine whether the party is a service subscriber and, if so, to determine the party's current IP address. The current IP address is used to address a query message sent over a data network, such as the Internet, to the party's Personal Computer (PC). The PC receives the message and a warm-line function which is active on the PC recognizes the message as a request for information to be retrieved from an open warm-line enabled application on the PC. The warm-line function prepares a request message which is passed to the open warm-line enabled application instructing that information which appears to be a telephone number or a means for finding a telephone number be retrieved from a current page of the application. When the open warm-line enabled application has retrieved the information, it passes the information to the warm-line function which formulates a response message that is passed back over the data network to the warm-line server that initiated the query. On receipt of the response message, the warm-line server examines the contents of the message to determine whether the message contains a telephone number or an index which may be used to obtain the telephone number. If the message contains an index to be used for obtaining a telephone number, the warm-line server formulates a query that it sends to an appropriate directory service to determine a telephone number for the called party. When a telephone number is returned from the directory service, the warm-line server instructs the CTI server to place a call to that number. If the number is answered, the two calls are bridged together and conversation ensues between the calling party and the called party's voice terminals.

The open application from which information is retrieved may be any warm-line enabled application. Examples of applications that are candidates to be warm-line enabled include:

electronic mail applications;

card file/address book applications;

WWW-based directories;

corporate directories;

personal organizers;

time/project management applications;

word processing applications; and spread sheets.

Warm-line enabled applications are preferably programmed to search a current page for information in the following order:

1) highlighted text;
2) number strings conforming to a known telephone number plan;
3) alphanumeric strings containing @ signs;
4) words which do not appear in a dictionary and are therefore assumed to be proper names. If there is any ambiguity about the information retrieved or the application finds more than one string which appears to be relevant, the application is preferably adapted to display a list of the information items found and permit the user to select the desired item from the list. If there is no ambiguity about the information retrieved, processing preferably proceeds automatically and transparently. After the required information is retrieved, it is returned to the warm-line server which uses the information to complete the second voice connection.

BRIEF DESCRIPTION OF THE DRAWINGS

The invention will now be further explained by way of example only and with reference to the following drawings wherein.

DETAILED DESCRIPTION OF THE PREFERRED EMBODIMENT

This invention relates to a method and system for voice call completion using information retrieved from an open application on a computing machine operated by a user of a "warm-line" service, hereinafter referred to as the "subscriber". In accordance with the method of the invention, the subscriber initiates a voice connection between first and second voice terminals by calling a predetermined termination, which is preferably computer-controlled telephony integration (CTI) hardware outside the PSTN. On receipt of the call, the CTI hardware passes the subscriber's telephone number to a warm-line server which uses the telephone number to verify that the calling party is a subscriber to the service and to retrieve the subscriber's current IP address. Using the IP address, the warm-line server sends a query to the subscriber's current IP address requesting that information be retrieved from an open warm-line enabled application on the computing machine. A warm-line function written in any appropriate software language accepts the query message and passes the request to the warm-line enabled application which returns a telephone number or information useful in finding a telephone number. The information is returned to the warm-line server which uses it to complete a second leg of the voice connection from the CTI hardware to the called party. If a connection is made with the second voice terminal, the two calls are joined and conversation between the subscriber and the called party ensues.

Figure 1:
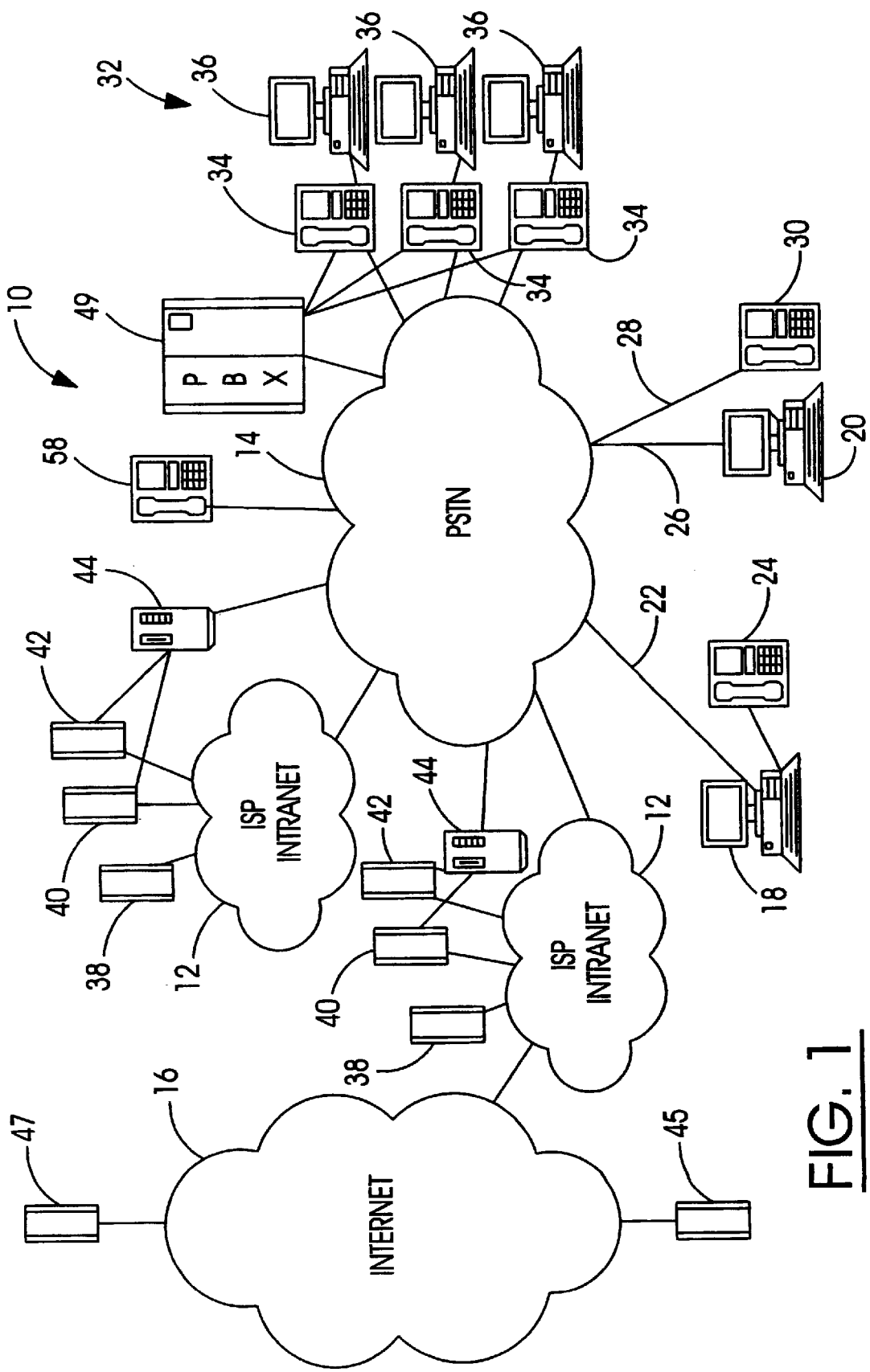
FIG. 1 is a schematic diagram of one potential configuration of apparatus in accordance with the invention.

FIG. 1 shows a schematic diagram of one potential configuration of a system in accordance with the invention, generally indicated by reference 10. It is assumed that the system in accordance with the invention will generally be offered as a service to business subscribers by service providers such as Internet Service Providers (ISPs). The system in accordance with the invention may also be owned and operated by a telephone service provider, a corporation or any other business organization. It will be understood by those skilled in the art that one need not be an ISP to make, use or sell a system in accordance with the invention. The description which follows assumes, for the sake of example, that this service is provided by an ISP.

As shown in FIG. 1, each ISP has an Intranet 12 which is connected to the Public Switched Telephone Network (PSTN) 14 in a manner well known in the art, and to the Internet 16 also in a manner well known in the art. Connected to the PSTN 14 are a plurality of subscribers. Many of the subscribers access the Internet 16 by way of an ISP using a dial-up connection to the PSTN 14. Access to the Internet 16 through the PSTN is generally accomplished using Personal Computers (PCs) such as a subscriber PC 18 which is connected to the PSTN 14 by a telephone line 22. In the case of that subscriber, only one telephone line 22 is available which is used for the PC 18 and the telephone 24 of the subscriber. Other subscribers may have two lines available such as dataline 26 which connects PC 20 to the PSTN 14 and a telephone line 28 which connects telephone 30 to the PSTN 14. Also connected to the PSTN 14 is a corporate subscriber to the system in accordance with the invention generally indicated by reference 32. The corporate subscriber 32 is a business having a plurality of employees who are furnished with telephones 34 and PCs 36. The telephones 34 are respectively connected to a PBX 49, which is in turn connected to PSTN 14 by a trunk group such as an ISDN trunk group, in a manner well known in the art. It should be understood that the service subscriber 32 need not operate a PBX 49 to use the system in accordance with the invention. Subscribers may have any known type of access to the PSTN, including a Plain Old Telephone Service (POTS) connection to the PSTN. In accordance with a preferred embodiment of the invention subscribers are preferably connected to a PSTN switching node that supports a warm-line or hot-line service, if they are not connected to a PBX, but this is not essential and is not a feature of the invention.

The system in accordance with the invention typically includes a warm-line server 38 for setting up and controlling subscriber call connections, a Computer Telephony Integration (CTI) server 40 for controlling CTI hardware 44 adapted to receive and to place calls. The system may also include a Voice over Internet Protocol (VoIP) gateway 42 which permits VoIP sessions to be conducted with called parties such as a called party having PC 18 connected to the PSTN 14 by a single telephone line 22, as will be explained below in more detail. The system in accordance with the invention may use one or more directory services 45, 47 connected to a data network such as the World Wide Web (WWW) for converting information into phone numbers or VoIP addresses, as will also be explained below in more detail. The directory services 45, 47 may also be corporate directories or public directories available on the Internet, or private directories on a corporate Intranet.

Figure 2:
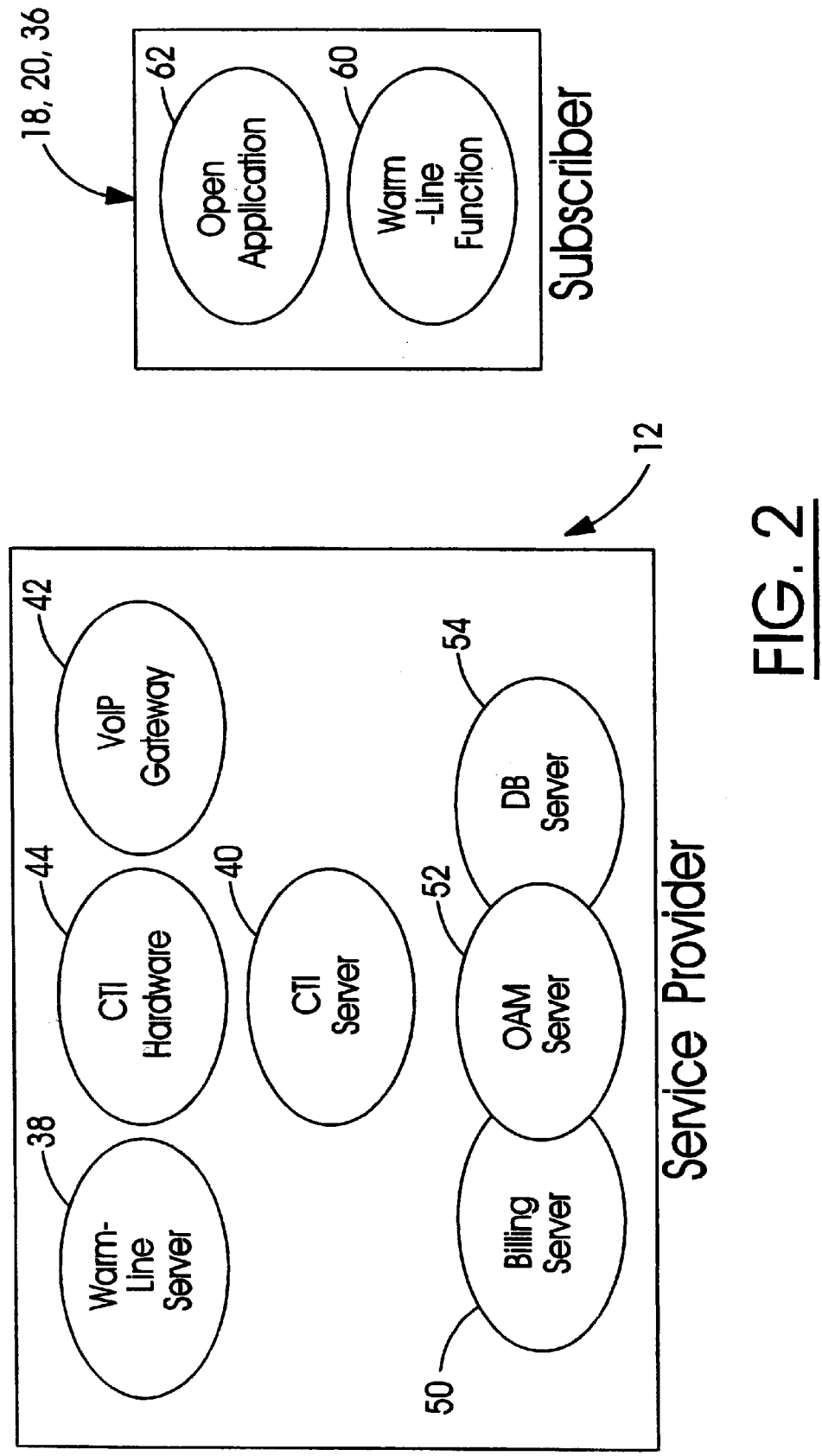
FIG. 2 is a block diagram showing the principal components of the invention at a service provider and a subscriber computing machine configured in accordance with the invention.

FIG. 2 is a block diagram showing the principal components of the system in accordance with the invention. As described above, the Intranet Service Provider (ISP) typically maintains servers for performing the principal functions of the system in accordance with the invention. For example, the ISP may maintain a warm-line server 38 for controlling subscriber call connections, retrieving information from subscriber PCs and querying directory services to convert information retrieved from a subscriber's PC into a telephone number or an IP address. The ISP 12 also maintains a CTI server 40 for controlling CTI hardware 44 conveniently used to connect calls between the calling and called parties. As will be understood, warm-line server 38 and CTI server 40 may be implemented on the same machine but for the sake of clarity they are illustrated and referred to as separate machines.

The subscriber has a PC 18, 20, 36 which is equipped with a warm-line function 60 and at least one open warm-line enabled application 62. The warm-line function 60 is active when the PC 18, 20, 36 is active and enabled to receive data messages sent by the warm-line server 38. Although referred to as a "function", it should be understood that the warm-line function 60 may be a dedicated application written in any appropriate computer software language. The warm-line enabled application, referred to in FIG. 2 as the "open application" 62, is any application having an interface for accepting messages from the warm-line function 60, and a facility for searching its current page for information such as a phone number or an index that might be useful in finding a phone number. The types of applications which are considered appropriate for being warm-line enabled are listed below in the discussion of FIG. 3 which follows.

Figure 3:
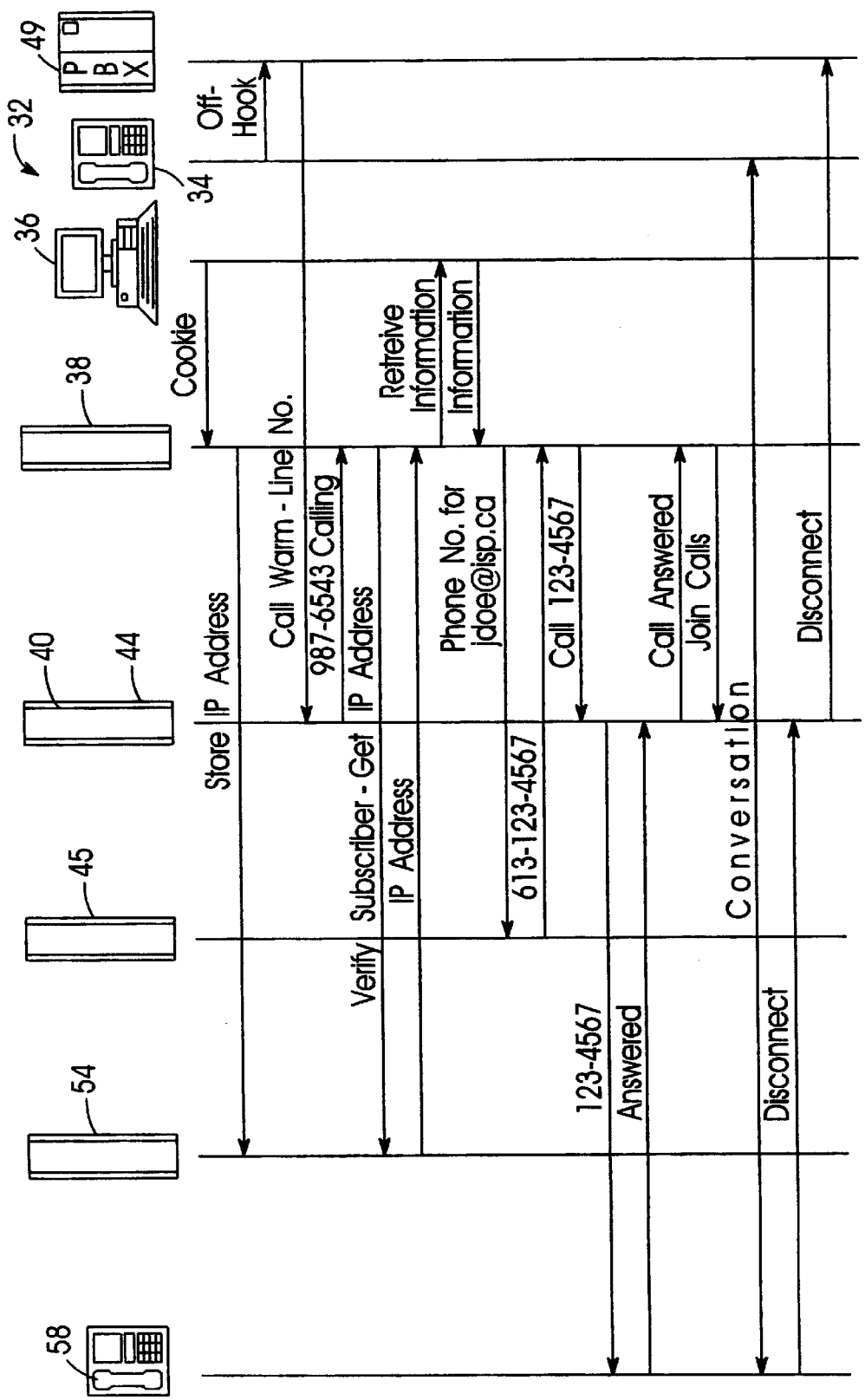
FIG. 3 is a simplified schematic view of a call flow performed using the apparatus and the methods in accordance with the invention.

FIG. 3 shows an exemplary use of the system in accordance with the invention. In the example shown in FIG. 3, the subscriber using the system is a business subscriber 32 having a PC 36 and a telephone 34 connected to a PBX 49. As described above, it should be understood that use of the invention is not limited to use of the PBX 49. Although it is convenient for a user to have a warm-line capability, which dials a predetermined number after a default delay when a telephone is taken off-hook, this is not an essential feature of the invention. A subscriber may have a service agreement with a local telephone service provider that supports a warm-line or a hot-line feature on its central office switching equipment. The difference between "warm-line" and "hot-line" is that a warm-line service only dials a default telephone number if no digits are dialled within a predefined time delay. With hot-line, the default number is dialled without delay. If neither service is available to a subscriber, the subscriber may use speed-dial, or even manually dial a number assigned to the CTI hardware 44 using a Plain Old Telephone Service (POTS) connection to the PSTN. The only system requirement is that the subscriber have an operating computing machine such as PC 36 connected to a data network such as the Internet and the computing machine have a warm-line enabled application open when a call is placed.

As noted above, before a subscriber 32 is capable of using the service enabled by the method and system in accordance with the invention, the subscriber's PC 36 must be connected to the Internet and the system must have a record of the subscriber's IP address. As is well known in the art, most IP addresses are dynamically assigned at logon to an ISP. When a data network session, such as an Internet session, is initiated, the session initiation process must therefore include some provision for passing the subscriber's current IP address to the warm-line server 38. This may be accomplished in any one of several ways. For example, a subscriber may be required to logon to the warm-line server 38. In that case, subscriber 32 connects to the warm-line server 38 and enters subscriber ID and password information which is verified against a subscriber record. If a match is confirmed, the current IP address of the subscriber 32 is captured and stored, for example, in the database server 54.

In accordance with an alternate procedure, verification of the subscriber 32 and storage of the subscriber's current IP address can be automatically effected by setting the home page of a web browser on PC 36 to home on the warm-line server 38. When the web browser attaches to the warm-line server 38, the web browser passes an encrypted cookie which includes subscriber identification information. The warm-line server 38 accepts the cookie and verifies the subscriber 32. Concurrently, the warm-line server 38 captures the current IP address of the subscriber 32 and stores it for later reference. The current IP address can, for example, be stored in the subscriber record or any other convenient location. Where and how the current IP address is stored is a matter of design choice.

In the example shown in FIG. 3, after initiating the data session, the subscriber 32 receives an electronic mail message (not illustrated) which is displayed on the PC 36. When the subscriber 32 has finished reading the message, the subscriber 32 decides that he would like to speak in person with the sender of the electronic mail message. In order to automatically accomplish this, the subscriber 32 takes the telephone 34 off-hook. The off-hook condition is recognized by the PBX 49. The PBX 49 is programmed to automatically dial a number assigned to the CTI hardware 44 of the CTI server 40 if no digits are dialled before a predetermined period of time has elapsed. PBX 49 therefore dials the warm-line number and the user is connected to the CTI server 40. On receipt of the call, the CTI server 40 extracts the telephone number of telephone 34. The telephone number may be supplied, for example, by the telephone service provider as a Calling Line Identification (CLID) service. The CTI server 40 passes the telephone number of the subscriber in a message to the warm-line server 38. The warm-line server 38 accepts the message and uses the telephone number of the subscriber to locate the subscriber's service record. In this example, the subscriber's service record is stored on the database server 54. The subscriber's service record is located in a table look-up. If the telephone number received from CTI server 40 is not matched in the subscriber service records, an error message is played to the caller and the call is disconnected.

In this example, the telephone number identifies the subscriber 32 and is used to retrieve the current IP address of the subscriber 32 from its storage location, the database server 54. The warm-line server 38 formulates a data message addressed to the IP address of PC 36. The warm-line server transmits the data message into Internet. The data message requests that information be retrieved from an open warm-line enabled application on the PC 36. The message is received by the warm-line function 60 (see FIG. 2) on PC 36. The warm-line function 60 searches for an open warm-line enabled application on PC 36. The search begins with the active application on the PC 36, which will normally be the application containing the desired information. A warm-line enabled application is any application which supports warm-line functionality. Examples of applications considered most useful are:

electronic mail applications;
card file/address book applications;
WWW-based directories;
corporate directories;
personal organizers;
time/project management applications;
word processing applications; and
spread sheets.

The applications that may be warm-line enabled are not limited to those listed above. Any application which is capable of storing telephone numbers, names and addresses and/or electronic mail addresses may be warm-line enabled.

Warm-line enabled applications include an interface for accepting request messages from the warm-line function 60 and returning reply messages to the warm-line function 60. On receipt of an information request message, the warm-line enabled application searches its current page for a telephone number or information which logically appears to be useful for retrieving a telephone number for a called party. In accordance with a preferred embodiment of the invention, the warm-line enabled application is programmed to search its current page in the following order:

1) highlighted text;
2) number strings conforming to a known telephone number plan;
3) alphanumeric strings containing @ signs;
4) words which do not appear in a dictionary and are therefore assumed to be proper names.

Preferably, the current page of the warm-line enabled application is completely parsed for each category of information before a next category is searched. As soon as a string which appears to satisfy the search is found, the search is stopped. If there is ambiguity about information uncovered in the search process, the warm-line application may be enabled to display messages to the subscriber. For example, the warm-line application may request that the subscriber select one number or one electronic mail address from among several, or may request that the subscriber highlight information that should be retrieved.

After the warm-line enabled application 62 has retrieved the requested information, it returns the information to the warm-line function 60. The warm-line function 60 accepts the information and formulates a return message to the warm-line server 38. The message is transmitted into the Internet and received by the warm-line server 38.

In this example, the information returned by the query is an electronic mail address for "jdoe@isp.ca". The warm-line server analyzes the information and determines that it does not conform to any known dialling plan. It also determines that the information includes an "@" sign and therefore appears to be an electronic mail address. The warm-line server 38 therefore prepares a query message which it addresses to the directory service 45 for translating electronic mail addresses to telephone numbers. The directory service 45 receives the query and returns to the warm-line server 38 a telephone number associated with the electronic mail address. The telephone number returned is "613-123-4567". The warm-line server 38 recognizes the telephone number to be within the local calling area of the CTI server 40 and therefore requests that the CTI server 40 call "123-4567". On receipt of the call request message, the CTI server 40 selects an unoccupied line on the CTI hardware 44 and instructs the CTI hardware 44 to dial the number "123-4567" which is a number for the called party telephone 58 (see FIG. 1). In this example, the called party telephone 58 is available and the called party answers the telephone 58. On receipt of the connect signal, the CTI server 40 informs the warm-line server 38 that the call has been answered and the warm-line server 38 instructs the CTI server 40 to join the first and second calls, which permits conversation between the subscriber 32 at telephone 34 and the called party at telephone 58. After the parties have finished their conversation, the telephone 58, for example, disconnects by going on-hook which sends a disconnect signal to the CTI server 40. The disconnect signal is then forwarded to the PBX 49.

Although in the call sequence illustrated above the telephone 58 was available and answered, it will be understood by those skilled in the art that the called party's telephone may not necessarily be available or answered. In those instances, several options exist for informing the subscriber of the unavailability. For example, the CTI server 40 may be programmed to announce when a called party is busy or does not answer. Alternatively, the CTI server may be programmed to inform the warm-line server 38 as soon as the second call is in progress and the warm-line server 38 may be programmed to instruct the CTI server 40 to connect the calls immediately so that ringing and/or busy signals are passed back over the voice connection to the telephone 34 of the subscriber 32.

As a further alternative, if the ISP 12 supports a VoIP gateway 40, the warm-line server may be programmed to determine if the telephone line of the called party is connected to the Internet when a busy signal is received. This may be accomplished if an electronic mail address for the called party is available. In certain cases, the electronic mail address may be used to obtain the current IP address of the called party. If a VoIP directory server used by the called party is known, a query is sent to that directory server using the electronic mail address as an index to find if there is a current valid IP address for the called party. If an IP address is returned, the called party is on the Internet and a VoIP session request can be launched by the warm-line server 38 to the called party's IP address. If the called party accepts the VoIP session, the VoIP gateway 42 can be used to convert the voice to IP packets and vice versa, and the subscriber can speak to the called party. This process can be an automated default, or the subscriber may be prompted to initiate it. Any combination of the options described above may be used to handle busy conditions on the called party line.

It will be further understood that although in the example shown in FIG. 3 an electronic mail address was returned from the warm-line enabled application on PC 36, a telephone number or a name and address could have been returned, for example. As directory services are improved, the capacity for converting information into telephone numbers will improve and warm-line functionality will have increasingly broad application. It should also be well understood that warm-line functionality is particularly useful in corporate environments where directory services may be readily available for converting, for example, electronic mail addresses or employee names into telephone numbers.

The invention therefore provides a convenient and useful system for rapidly completing voice connections with others without a requirement for manually retrieving or dialling the number of the called party.

Changes and modifications to the above-described embodiments will no doubt become apparent to those skilled in the art. The scope of the invention is therefore intended to be limited solely by the scope of the appended claims.

We claim:

1. A method of completing a voice connection between first and second voice terminals, comprising the steps of:

establishing a first voice connection between the first voice terminal and a predetermined termination;

locating a data address for a computing machine associated with the first voice terminal after the voice connection is established with the predetermined termination;

sending a data message to the data address requesting that information be retrieved from an open application on the computing machine;

retrieving the information from the open application and returning a data message including the information;

using the information at the predetermined termination to establish a second voice connection with the second voice terminal; and bridging together the first and second voice connections.

2. A method of completing a voice connection between first and second voice terminals as claimed in claim 1 wherein the first voice terminal, or a telephone switch to which the first voice terminal is connected, is adapted to automatically dial a predetermined number if at least one other digit is not dialled within a predetermined period of time after the first voice terminal is changed from an on-hook to an off-hook condition.

3. A method of completing a voice connection between first and second voice terminals as claimed in claim 1 wherein the first predetermined termination is with voice connection switching circuits controlled by a server.

4. A method of completing a voice connection between first and second voice terminals as claimed in claim 3 wherein the server determines the identification of the first voice terminal using calling line identification to obtain a telephone number associated with the first voice terminal.

5. A method of completing a voice connection between first and second voice terminals as claimed in claim 4 wherein the server uses the telephone number associated with the first voice terminal in a table look-up to determine the data address associated with the first voice terminal.

6. A method of completing voice connection between first and second voice terminals as claimed in claim 5 wherein the data address is an Internet Protocol IP address of the computing machine and the computing machine is connected to an IP network which may be accessed by the server.

7. A method of completing a voice connection between first and second voice terminals as claimed in claim 6 wherein software active on the computing machine receives the data message from the server and searches a current page of the open application for the information.

8. A method of completing a voice connection between first and second voice terminals as claimed in claim 7 wherein the information retrieved from the current page is an e-mail address which is sent in the return message to the server.

9. A method of completing a voice connection between first and second voice terminals as claimed in claim 8 wherein the e-mail address is used by the server to retrieve a telephone number from a directory service to permit the server to complete the voice connection with the second voice terminal.

10. A method of completing a voice connection between first and second voice terminals as claimed in claim 8 wherein the e-mail address is used by the server to retrieve an Internet Protocol (IP) address from a directory service to permit the server to complete a Voice over Internet Protocol (VoIP) connection with the second voice terminal.

11. A method of completing a voice connection between first and second voice terminals as claimed in claim 1 wherein the first voice connection between the first voice terminal and a predetermined terminating end is initiated with a speed-dial key on the first voice terminal.

12. System for completing a voice connection between first and second voice terminals, comprising in combination:

computer-controlled telephony hardware adapted to receive and to originate calls;

a server adapted to control the telephony hardware and determine an identification of the first voice terminal on receipt of a call from the first voice terminal, to determine a data address of a computing machine associated with the first voice terminal, and to send a message to request that information be retrieved from an application open on the computing machine;

means on the computing machine for receiving the message, retrieving the information from the open application and returning the information in a reply message to the server; and means for receiving the reply message, completing a voice connection with the second voice terminal from the telephony hardware using the information, and bridging together the first and second voice connections.

13. Apparatus for completing a voice connection between first and second voice terminals as claimed in claim 12 wherein the first voice terminal is connected to a private branch exchange and the private branch exchange is programmed to dial the computer-controlled telephony hardware if a digit is not dialled within a predetermined time period after the first voice terminal is changed from an on-hook to an off-hook condition.

14. Apparatus for completing a voice connection between first and second voice terminals as claimed in claim 12 wherein the first voice terminal is connected to a switching node in a switched telephone network and the switching node is programmed to dial the computer-controlled telephony hardware if a digit is not dialled within a predetermined time period after the first voice terminal is changed from an on-hook to an off-hook condition.

15. Apparatus for completing a voice connection between first and second voice terminals as claimed in claim 12 wherein the first voice terminal has a speed-dial feature and a one of the speed-dial numbers dials the computer-controlled telephony hardware.

16. Apparatus for completing a voice connection between first and second voice terminals as claimed in claim 12 wherein the server determines the identification of the first voice terminal using a calling line identification feature provided by a switched telephone network service provider.

17. Apparatus for completing a voice connection between first and second voice terminals as claimed in claim 12 wherein the server is adapted to determine whether the first voice terminal is associated with a subscriber and to disconnect the first voice terminal if the first voice terminal is not associated with a subscriber recognized by the server.

18. Apparatus for completing a voice connection between first and second voice terminals as claimed in claim 12 wherein the data address associated with the first voice terminal is determined in a table lookup in which the identification of the first voice terminal is associated with the data address.

19. Apparatus for completing a voice connection between first and second voice terminals as claimed in claim 12 wherein the server uses a directory service to convert the information received in the reply message to an address for completing the voice connection with the second voice terminal.

20. Apparatus for completing a voice connection between first and second voice terminals as claimed in claim 19 wherein the information comprises an e-mail address.

21. Apparatus for completing a voice connection between first and second voice terminals as claimed in claim 20 wherein the e-mail address is converted to a telephone number retrieved from the directory service.

22. Apparatus for completing a voice connection between first and second voice terminals as claimed in claim 20 wherein the e-mail address is converted to an IP address and the IP address is used by the server to complete a VoIP voice connection with the second voice terminal.

23. A method of completing a voice connection between first and second voice terminals using information from an application open on a computing machine to locate an address for the second voice terminal, comprising the steps of:

completing a voice connection to a telephone switching point using the first voice terminal;

sending a query from the telephone switching point to the computing machine to retrieve the information;

examining the information to determine whether it directly or indirectly defines an address for completing a voice connection with the second voice terminal;

if the information indirectly defines the address, sending a query message to a directory to obtain the address and receiving a response message containing the address from the directory; and completing the voice connection between the first and second voice terminals using the address for the second voice terminal.

24. A method as claimed in claim 23 wherein the telephone switching point comprises telephony hardware controlled by a server in a data network.

25. A method as claimed in claim 23 wherein the computing machine is a personal computer operated by an operator of the first voice terminal.

26. A method as claimed in claim 25 wherein the personal computer is identified using a telephone number associated with the first voice terminal in a table look-up to locate an Internet Protocol (IP) address of the personal computer.

27. A method as claimed in claim 26 wherein the IP address is a temporary address assigned by an Internet service provider at the beginning of each Internet session.

28. A method as claimed in claim 27 wherein the IP address is stored in the look-up table when the operator of the personal computer logs on to the server.

29. A method as claimed in claim 27 wherein the IP address is stored in the look-up table when a browser application on the personal computer connects to the server and passes identification information to the server.

30. A method as claimed in claim 29 wherein the identification information is stored in an encrypted cookie that is transparently passed by the browser application to the server.

31. A method as claimed in claim 23 wherein if the second voice terminal is determined to be busy, the method further comprises the steps of:

locating an electronic mail address associated with the first voice terminal;

using the electronic mail address to locate the current IP address at a VoIP directory server;

receiving from the Voice over Internet Protocol (VoIP) directory server a current IP address assigned to the computing machine; and sending a VoIP session request to the computing machine if a current IP address is located.

* * * * *